United States Patent
En et al.

(10) Patent No.: US 11,694,461 B2
(45) Date of Patent: Jul. 4, 2023

(54) OPTICAL CHARACTER RECOGNITION METHOD AND APPARATUS, ELECTRONIC DEVICE AND STORAGE MEDIUM

(71) Applicant: Beijing Baidu Netcom Science and Technology Co., Ltd., Beijing (CN)

(72) Inventors: Mengyi En, Beijing (CN); Shanshan Liu, Beijing (CN); Xuan Li, Beijing (CN); Chengquan Zhang, Beijing (CN); Hailun Xu, Beijing (CN); Xiaoqiang Zhang, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 286 days.

(21) Appl. No.: 17/199,072

(22) Filed: Mar. 11, 2021

(65) Prior Publication Data
US 2021/0390296 A1    Dec. 16, 2021

(51) Int. Cl.
*G06V 30/414*    (2022.01)
*G06F 40/279*    (2020.01)
(Continued)

(52) U.S. Cl.
CPC .......... *G06V 30/414* (2022.01); *G06F 40/279* (2020.01); *G06N 3/08* (2013.01);
(Continued)

(58) Field of Classification Search
CPC .... G06V 30/10; G06V 30/148; G06V 30/262; G06V 30/413; G06V 30/414;
(Continued)

(56) References Cited

U.S. PATENT DOCUMENTS 5,201,011 A    4/1993    Bloomberg et al.
6,470,094 B1 *  10/2002   Lienhart ............... G06T 7/194
                                                    382/176
(Continued)

FOREIGN PATENT DOCUMENTS

CN    110309824 A    10/2019
EP    1229485 A2    8/2002
(Continued)

OTHER PUBLICATIONS

European Search Report, EP Application No. 21162073.7 dated Sep. 3, 2021, 18 pages.
(Continued)

*Primary Examiner* — Daniel G Mariam
(74) *Attorney, Agent, or Firm* — Kwan & Olynick LLP (57) ABSTRACT

The present application discloses a method and an apparatus for optical character recognition, an electronic device and a storage medium, and relates to the fields of artificial intelligence and deep learning. The method may include: determining, for a to-be-recognized image, a text bounding box of a text area therein, and extracting a text area image from the to-be-recognized image according to the text bounding box; determining a bounding box of text lines in the text area image, and extracting a text-line image from the text area image according to the bounding box; and performing text sequence recognition on the text-line image, and obtaining a recognition result. The application of the solution in the present application can improve a recognition speed and the like.

14 Claims, 3 Drawing Sheets

(51) Int. Cl.
*G06N 3/08* (2023.01)
*G06V 30/413* (2022.01)
*G06V 30/148* (2022.01)
*G06V 30/19* (2022.01)
*G06V 30/262* (2022.01)
*G06V 10/82* (2022.01)
*G06V 20/62* (2022.01)
*G06V 30/10* (2022.01)

(52) U.S. Cl.
CPC ............. *G06V 10/82* (2022.01); *G06V 20/62* (2022.01); *G06V 30/148* (2022.01); *G06V 30/19173* (2022.01); *G06V 30/262* (2022.01); *G06V 30/413* (2022.01); *G06V 30/10* (2022.01)

(58) Field of Classification Search
CPC .. G06V 30/19173; G06V 10/82; G06V 20/62; G06N 3/08; G06F 40/279
See application file for complete search history.

(56) References Cited

U.S. PATENT DOCUMENTS

| | | | |
|---|---|---|---|
| 11,367,297 B2* | 6/2022 | Bildner | G06V 30/414 |
| 2002/0102022 A1 | 8/2002 | Ma et al. | |
| 2002/0159636 A1 | 10/2002 | Lienhart et al. | |
| 2016/0034441 A1* | 2/2016 | Nguyen | G06F 40/137 715/234 |
| 2019/0155883 A1* | 5/2019 | Wang | G06V 30/413 |
| 2021/0334602 A1* | 10/2021 | Liu | G06V 30/414 |

FOREIGN PATENT DOCUMENTS

| | | | |
|---|---|---|---|
| EP | 1229485 A3 | 5/2004 | |
| WO | 0169529 A2 | 9/2001 | |
| WO | 0169529 A3 | 9/2001 | |

OTHER PUBLICATIONS

Richardson, Elad et al., "It's All About The Scale—Efficient Text Detection Using Adaptive Scaling", 2020 IEEE Winter Conference on Computer Vision, Mar. 1, 2020, pp. 1-5, 11-15.

He, Wenhao et al., "Realtime multi-scale scene text detection with scale-based region proposal network", Pattern Recognition, Elsevier, GB, vol. 98, Sept. 3, 2019.

European Search Report and Written Opinion for application No. EP21162073.7, dated Jan. 11, 2022, 20 pages.

Zhu, Yixing and Du, Jun, TextMountain: Accurate Scene Text Detection via Instance Segmentation, National Engineering Laboratory for Speech Language Information Processing, University of Science and Technology of China, Hefei, Anhui, China. Elsevier Ltd. 2020, 110 (2021) 107336, 11 pages.

* cited by examiner

OPTICAL CHARACTER RECOGNITION METHOD AND APPARATUS, ELECTRONIC DEVICE AND STORAGE MEDIUM

The present application claims the priority of Chinese Patent Application No. 202010550694.1, filed on Jun. 16, 2020, with the title of "Optical character recognition method and apparatus, electronic device and storage medium". The disclosure of the above application is incorporated herein by reference in its entirety.

FIELD OF THE DISCLOSURE

The present application relates to computer application technologies, and particularly to a method and an apparatus for optical character recognition, an electronic device and a storage medium in the fields of artificial intelligence, specially the fields of the computer vision and deep learning.

BACKGROUND OF THE DISCLOSURE

An Optical Character Recognition (OCR) technology is widely used in industrial fields, such as certificate recognition. Current OCR implementation methods are generally complex, resulting in a slow recognition speed.

SUMMARY OF THE DISCLOSURE

The present application provides a method and an apparatus for optical character recognition, an electronic device and a storage medium.

A method for optical character recognition is provided, including:

determining, for a to-be-recognized image, a text bounding box of a text area therein, and extracting a text area image from the to-be-recognized image according to the text bounding box;

determining a bounding box of text lines in the text area image, and extracting a text-line image from the text area image according to the bounding box; and performing text sequence recognition on the text-line image, and obtaining a recognition result.

An electronic device is provided, comprising:

at least one processor; and a memory communicatively connected with the at least one processor;

wherein the memory stores instructions executable by the at least one processor, and the instructions are executed by the at least one processor to enable the at least one processor to perform a method for optical character recognition, wherein the method comprises:

determining, for a to-be-recognized image, a text bounding box of a text area therein, and extracting a text area image from the to-be-recognized image according to the text bounding box;

determining a bounding box of text lines in the text area image, and extracting a text-line image from the text area image according to the bounding box; and performing text sequence recognition on the text-line image, and obtaining a recognition result.

There is provided a non-transitory computer readable storage medium with computer instructions stored thereon, wherein the computer instructions are used for causing a computer to perform a method for optical character recognition, wherein the method comprises:

determining, for a to-be-recognized image, a text bounding box of a text area therein, and extracting a text area image from the to-be-recognized image according to the text bounding box;

determining a bounding box of text lines in the text area image, and extracting a text-line image from the text area image according to the bounding box; and performing text sequence recognition on the text-line image, and obtaining a recognition result.

One embodiment of the present application has the following advantages or beneficial effects: first, a text area may be extracted from a to-be-recognized image, then text lines may be further extracted from the text area, and text sequence recognition may be performed on the text lines, so as to obtain recognition results, which, on the premise of ensuring high recognition accuracy, has characteristics of simple logic and a small amount of calculation, thereby improving a recognition speed, can be run in various computing environments such as a Graphics Processing Unit (GPU) and a Central Processing Unit (CPU), and has wide applicability. It shall be understood that the content described in this part is neither intended to identify key or important features of embodiments of the present disclosure and nor intended to limit the scope of the present disclosure. Other effects of the above alternatives will be described below with reference to specific embodiments.

BRIEF DESCRIPTION OF DRAWINGS

The accompanying drawings are intended to better understand the solution and do not constitute limitations on the present application. In the drawings.

DETAILED DESCRIPTION OF PREFERRED EMBODIMENTS

Exemplary embodiments of the present application are described below with reference to the accompanying drawings, including various details of the embodiments of the present application to facilitate understanding, and should be considered as exemplary only. Therefore, those of ordinary skill in the art should be aware that various changes and modifications can be made to the embodiments described herein without departing from the scope and spirit of the present application. Similarly, for clarity and simplicity, descriptions of well-known functions and structures are omitted in the following description.

In addition, it shall be understood that the term "and/or" herein is merely an association relationship describing associated objects, indicating that three relationships may exist. For example, A and/or B indicates that there are three cases of A alone, A and B together, and B alone. In addition, the character "/" herein generally means that associated objects before and after it are in an "or" relationship.

Figure 1:
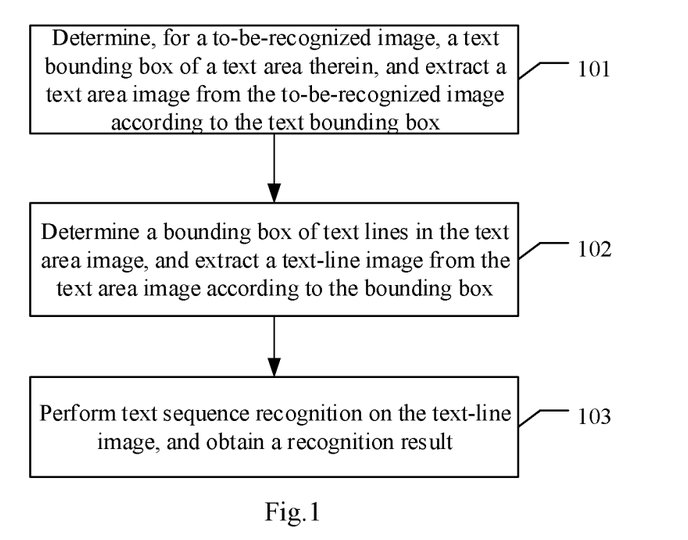
FIG. 1 is a flowchart of an embodiment of a method for optical character recognition according to the present application.

FIG. 1 is a flowchart of an embodiment of a method for optical character recognition according to the present application. As shown in FIG. 1, the method includes following specific implementations.

In 101, for a to-be-recognized image, a text bounding box of a text area therein is determined, and a text area image is extracted from the to-be-recognized image according to the text bounding box.

In 102, a bounding box of text lines in the text area image is determined, and a text-line image is extracted from the text area image according to the bounding box.

In 103, text sequence recognition is performed on the text-line image, and a recognition result is obtained.

The above method has characteristics of simple logic and a small amount of calculation, which can improve a recognition speed, can be run in various computing environments such as a GPU and a CPU, and has wide applicability.

Before a bounding box of text lines in the text area image is determined, an adjustment mode of the text area image may be determined, and a dimension of the text area image may be adjusted according to the determined adjustment mode.

In an actual application, one or more text areas may be determined from the to-be-recognized image. When there are more text areas, the text areas may be processed in the same manner.

In the same image, dimensions of text may vary greatly, and for some text that is too large or too small, it is often difficult to accurately detect complete text lines through single-model and single-scale detection. A traditional processing manner is to first scale an input image to several different dimensions, then input the scaled images into a text detector for detection, and finally integrate detection results under different input dimensions through a post-processing strategy such as Non Maximum Suppression (NMS), to obtain a final detection result. Such a method is based on an assumption that after scaling to different dimensions, each text line may be scaled at least once to a dimension suitable for detection by the text detector. However, such a processing method has at least the following problems. 1) A plurality of input entire graphs of different dimensions need to be processed, and the calculation amount at the whole graph level is considerable, so the efficiency is low. Moreover, if a scaling dimension is not appropriate, the text line is not scaled to an appropriate dimension, which is bound to cause a waste of computing resources. 2) For the same text line, if it is detected under a plurality of dimensions by the text detector, it is necessary to select, through certain prior rules, which result to retain. However, such prior rules designed manually are often not robust enough and may cause loss of precision.

With respect to the above problems, it is proposed in the present embodiment that the to-be-recognized image may be input to a pre-trained lightweight text scale prediction model, and obtain an output single-channel text mask (TM) graph and a text scale (TS) graph; wherein values of pixels in the text mask graph respectively represent probabilities of the corresponding pixels belonging to a text area, and values of pixels in the text scale graph respectively represent ratios of dimensions of the shortest edges of text lines to which the corresponding pixels belong to a preset optimal dimension. The edges of the text lines include width and height. Generally, the height is smaller than the width in dimension. Correspondingly, the text bounding box of a text area in the to-be-recognized image may be determined according to the text mask graph, and the adjustment mode of the text area image may be determined according to the text scale graph.

The lightweight text scale prediction model may include: a first feature extraction module, a first prediction module and a second prediction module; wherein the first feature extraction module is configured to perform feature extraction on an input image, the first prediction module is configured to generate the text mask graph according to a feature extraction result, and the second prediction module is configured to generate the text scale graph according to the feature extraction result.

The lightweight text scale prediction model may be a full convolutional network. The first feature extraction module may be a small Convolutional Neural Network (CNN). Based on the feature extraction result of the first feature extraction module, the first prediction module may segment text areas in the image, and the second prediction module may predict a ratio (proportion) between a dimension of the shortest edge of the text line in each text area and a preset optimal dimension. The first prediction module and the second prediction module may include 3 convolutional layers respectively. Correspondingly, the lightweight text scale prediction model finally outputs two single-channel segmentation graphs, i.e., a text mask graph and a text scale graph. In the text mask graph, values of pixels respectively represent probabilities of the corresponding pixels belonging to a text area, and the probabilities may range from 0 to 1. In the text scale graph, values of pixels respectively represent ratios of dimensions of the shortest edges of text lines to which the corresponding pixels belong to a preset optimal dimension.

In a training stage, for the test mask graph, values of pixels in a background area, i.e., non-text area, may be 0, while values of pixels in a text area may be 1. For the text scale graph, values of pixels are ratios of dimensions of the shortest edges of text lines to which the corresponding pixels belong to a preset optimal dimension. The optimal dimension may be a super parameter, and a specific value may be determined according to an actual requirement. In terms of selection of a loss function, dice-loss may be selected for the first prediction module, and smooth-L1 loss may be selected for the second prediction module.

In a prediction stage, the to-be-recognized image may be input to a pre-trained lightweight text scale prediction model, and obtain an output text mask graph and a text scale graph. Then, all text connected components in the text mask graph can be determined through connected component analysis. Each text connected component represents a separate text area. For any text connected component, i.e., for each text connected component, a minimum rectangle including the text connected component in the to-be-recognized image can be determined respectively as a text bounding box corresponding to the text connected component, and then a text area image may be extracted from the to-be-recognized image according to the text bounding box.

For each text area image, values of pixels of the text area image in the text scale graph may be determined respectively. The pixels in the text area image have the same value in the text scale graph. In other words, in the preset embodiment, it is assumed that text lines in the same text area have the same dimension, for example, text lines in the same text area have the same dimension in height, and the height is generally smaller than the width in dimension. Then, for each text area image, an adjustment mode corresponding thereto may be: under a precondition of retaining an aspect ratio of the text area image, adjusting width and height dimensions of the text area image to make the dimensions of the shortest edges of the text lines after adjustment equal to the optimal dimension.

With the above processing method, a text area in a to-be-recognized image can be rapidly and accurately determined based on a text mask graph and a text scale graph output by a lightweight text scale prediction model, and a dimension of a text area image can be directly adjusted to an appropriate dimension, so as to facilitate subsequent processing, which improves the accuracy of subsequent processing results and avoids problems such as low efficiency and precision loss caused by scaling of an image to a plurality of different dimensions tin the traditional method.

For each text area image, bounding boxes of text lines in the text area image can be determined respectively, and text-line images can be extracted from the text area image according to the bounding boxes.

The text area image may be input to a pre-trained lightweight text detection model, and an output single-channel text center line (TCL) response graph and a four-channel text boarder offset (TBO) graph are obtained. Values of pixels in the TCL response graph respectively represent probabilities of the corresponding pixels belonging to a text-line center line area, and values of pixels in the TBO graph respectively represent horizontal and vertical distances of the corresponding pixels from upper borders of text lines to which they belong and from lower borders of the text lines to which they belong.

The lightweight text detection model may include: a second feature extraction module, a third prediction module and a fourth prediction module; wherein the second feature extraction module is configured to perform feature extraction on an input image, the third prediction module is configured to generate the TCL response graph according to a feature extraction result, and the fourth prediction module is configured to generate the TBO graph according to the feature extraction result.

The lightweight text detection model may be obtained by proper simplification on the basis of an existing Single-Shot Arbitrarily-Shaped Text (SAST) model. The second feature extraction module may adopt a lightweight deep residual network, such as Resnet-18, so as to reduce the amount of calculation of feature extraction as far as possible and simplify four prediction branches of SAST into two branches, that is, the third prediction module and the fourth prediction module. The third prediction module and the fourth prediction module may include 4 convolutional layers respectively. Therefore, the lightweight text detection model is a full convolutional network, and finally outputs a TCL response graph and a TBO graph. The TCL response graph is single-channel. Values of pixels respectively represent probabilities of the corresponding pixels belonging to a text-line center line area, and the probabilities may range from 0 to 1. The TBO graph is four-channel. Values of pixels respectively represent horizontal and vertical distances of the corresponding pixels from upper borders of text lines to which they belong and from lower borders of the text lines to which they belong. In other words, the value of any pixel represents a horizontal distance of the corresponding pixel from an upper border of the text line to which it belongs, a vertical distance from the upper border of the text line to which it belongs, a horizontal distance from a lower border of the text line to which it belongs, and a vertical distance from the lower border of the text line to which it belongs.

In the training stage, the configuration of SAST may be followed. The TCL response graph may be supervised by dice-loss, and the TBO graph may be supervised by smooth-L1 loss.

In the prediction stage, the text area image is input to a lightweight text detection model, and an output TCL response graph and a TBO graph are obtained. Then, bounding boxes of text lines in the text area image may be determined according to the TCL response graph and the TBO graph. Preferably, center lines of the text lines may be determined by performing connected component analysis on the TCL response graph; and for any center line, a bounding box of the text line corresponding to the center line may be determined according to values of pixels of the center line in the TBO graph respectively, and the bounding box may correspond to the text area image. Then text-line images may be extracted from the text area image according to the bounding boxes.

With the above processing method, text lines in a text area image can be rapidly and accurately determined based on a TCL response graph and a TBO graph output by a lightweight text detection model. Moreover, text area images acquired may be processed in parallel, thereby further improving the processing speed.

For each text-line image acquired, text sequence recognition may be performed on the text-line image, and a recognition result is obtained. Preferably, the text-line image may be input to a pre-trained lightweight text sequence recognition model, and an output recognition result is obtained. Specifically, for the input text-line image, the lightweight text sequence recognition model may first obtain features of the text-line image through a feature extraction convolutional network, then serialize the features into several frames, and input the frames to a bidirectional Gated Recurrent Unit (GRU) for classification and prediction. The specific implementation is the prior art. In the training stage, the text sequence recognition may be supervised by classical CTC (Connectionist Temporal Classification) loss.

For the above structure of the lightweight text sequence recognition model, the amount of calculation of the convolutional network in the feature extraction part accounts for a large part of the amount of calculation of the whole model. In order to lower the calculation overhead of the model, a lighter feature extraction convolutional network structure may be adopted.

In the present embodiment, instead of the traditional method of manually designing a network structure, the network structure is obtained through automatic search by using an Automated Machine Learning (AutoML) technology. In other words, the feature extraction convolutional network structure in the lightweight text sequence recognition model may be determined by automatic machine learning model search.

Specifically, the whole network search task may be controlled by a Recurrent Neural Network (RNN) controller that can predict network configuration. By means of reinforcement learning, the controller is optimized with both model accuracy and prediction time consumption as training objectives, and an optimal network structure is selected through the controller. In terms of search space, the whole feature extraction convolutional network may be divided into several sub-modules. For the consideration of model light weight, 3 sub-modules may be provided. The sub-modules are of the same structure. Each sub-module may consist of several layers each consisting of multiple operators, such as convolution, pooling, and shortcut connection. Then, the search space of the network search task may include: specific configuration of the layers used in each sub-module (such as selection of operators and a connection mode), as well as the number of layers included in each sub-module.

Compared with the method of manually designing a network structure, the above method can greatly the labor cost and have higher precision. Besides, since the accuracy is guaranteed, during text sequence recognition, simple Connectionist Temporal Classification (CTC) decoding logic can be used for text sequence recognition and decoding, thereby reducing the implementation complexity and further improving the processing speed.

Figure 2:
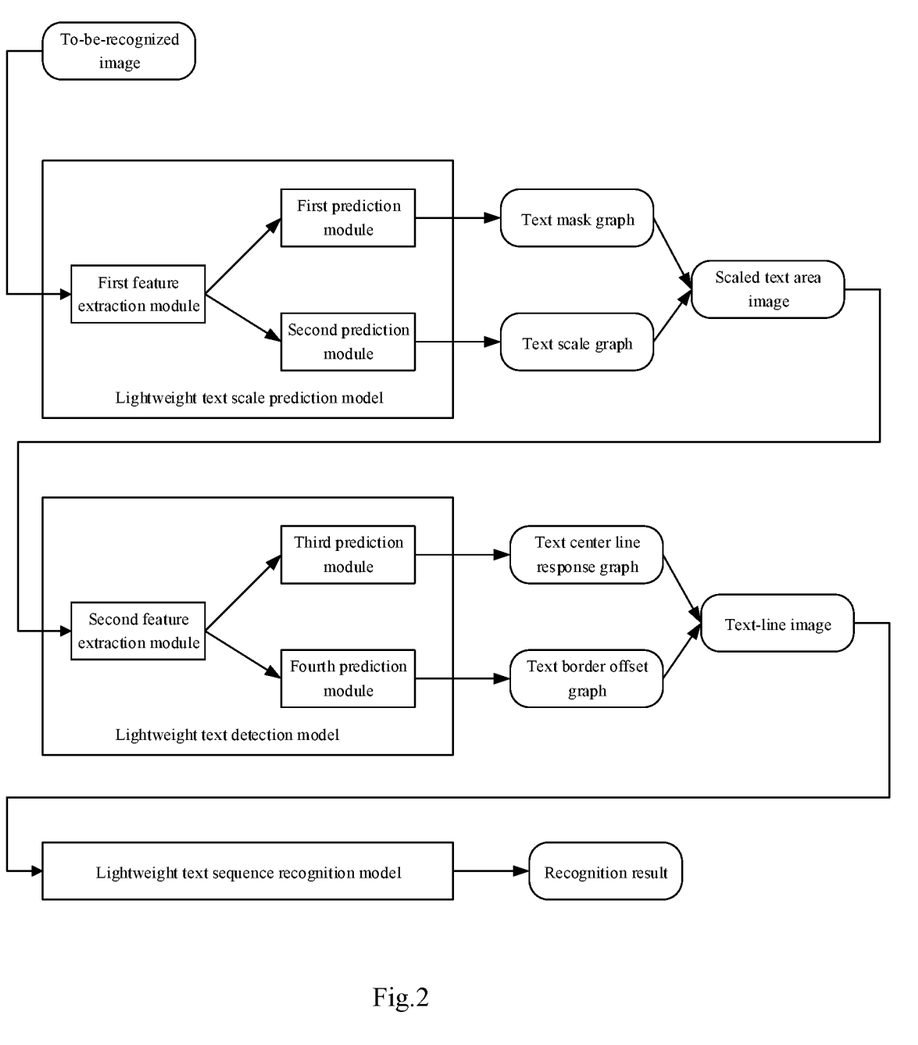
FIG. 2 is a schematic diagram of an overall implementation process of the method for optical character recognition according to the present application.

Based on the above introduction, FIG. 2 is a schematic diagram of an overall implementation process of the method for optical character recognition according to the present application. Specific implementation thereof may be obtained with reference to the foregoing related description and is not repeated.

Based on the above, the present embodiment provides a lightweight universal optical character recognition method consisting of a lightweight text scale prediction model, a lightweight text detection model, and a lightweight text sequence recognition model, which, on the premise of ensuring high recognition accuracy, has characteristics of simple logic and a small amount of calculation, thereby improving a recognition speed, can be run in various computing environments such as a GPU and a CPU, and has wide applicability.

It shall be noted that for ease of description, the foregoing method embodiment is described as a series of action combinations. However, those skilled in the art should understand that the embodiments of the present application are not limited to the sequence of actions described, as some steps may be performed in another sequence or simultaneously according to the present application. Next, those skilled in the art should also understand that the embodiments described in this specification all belong to preferred embodiments, and actions and modules involved are not necessarily mandatory to the present application.

The above is an introduction to the method embodiment, and the following is a further description of the solution according to the present application through an apparatus embodiment.

Figure 3:
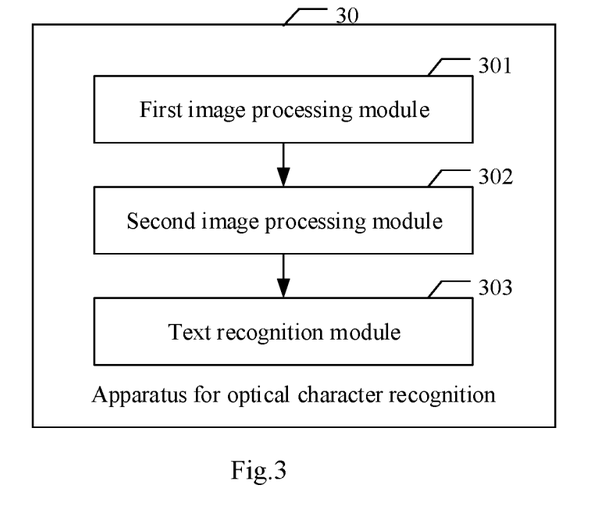
FIG. 3 is a schematic composition structure diagram of an apparatus 30 for optical character recognition according to the present application.

FIG. 3 is a schematic composition structure diagram of an apparatus 30 for optical character recognition according to the present application. As shown in FIG. 3, the apparatus includes: a first image processing module 301, a second image processing module 302 and a text recognition module 303.

The first image processing module 301 is configured to determine, for a to-be-recognized image, a text bounding box of a text area therein, and extract a text area image from the to-be-recognized image according to the text bounding box.

The second image processing module 302 is configured to determine a bounding box of text lines in the text area image, and extract a text-line image from the text area image according to the bounding box.

The text recognition module 303 is configured to perform text sequence recognition on the text-line image, and obtain a recognition result.

For the extracted text area image, the first image processing image 301 may further determine an adjustment mode of the text area image, and adjust a dimension of the text area image according to the determined adjustment mode.

The first image processing module 301 may input the to-be-recognized image to a pre-trained lightweight text scale prediction model, and obtain an output single-channel text mask graph and a text scale graph; wherein values of pixels in the text mask graph respectively represent probabilities of the corresponding pixels belonging to a text area, and values of pixels in the text scale graph respectively represent ratios of dimensions of the shortest edges of text lines to which the corresponding pixels belong to a preset optimal dimension. Further, the first image processing module 301 may determine the text bounding box of a text area in the to-be-recognized image according to the text mask graph, and determine the adjustment mode of the text area image according to the text scale graph.

Specifically, the first image processing module 301 may determine text connected components in the text mask graph through connected component analysis, and determine, for any text connected component, a minimum rectangle including the text connected component in the to-be-recognized image respectively as a text bounding box corresponding to the text connected component.

The first image processing module 301 may determine, for any text area image, values of pixels of the text area image in the text scale graph respectively, the pixels of the text area image having the same value in the text scale graph. Correspondingly, the adjustment mode of the text area image may include: under a precondition of retaining an aspect ratio of the text area image, adjusting width and height dimensions of the text area image to make the dimensions of the shortest edges of the text lines after adjustment equal to the optimal dimension.

The lightweight text scale prediction model may include: a first feature extraction module, a first prediction module and a second prediction module; wherein the first feature extraction module is configured to perform feature extraction on an input image, the first prediction module is configured to generate the text mask graph according to a feature extraction result, and the second prediction module is configured to generate the text scale graph according to the feature extraction result.

The second image processing module 302 may input the text area image to a pre-trained lightweight text detection model, and obtain an output single-channel TCL response graph and a four-channel TBO graph; wherein values of pixels in the TCL response graph respectively represent probabilities of the corresponding pixels belonging to a text-line center line area, and values of pixels in the TBO graph respectively represent horizontal and vertical distances of the corresponding pixels from upper borders of text lines to which they belong and from lower borders of the text lines to which they belong. Correspondingly, the second image processing module 302 may determine the bounding box of the text lines in the text area image according to the TCL response graph and the TBO graph.

Specifically, the second image processing module 302 may determine center lines of the text lines by performing connected component analysis on the TCL response graph; and determine, for any center line, a bounding box of the text line corresponding to the center line according to values of pixels of the center line in the TBO graph respectively, and make the bounding box correspond to the text area image.

The lightweight text detection model may include: a second feature extraction module, a third prediction module and a fourth prediction module; wherein the second feature extraction module is configured to perform feature extraction on an input image, the third prediction module is configured to generate the TCL response graph according to a feature extraction result, and the fourth prediction module is configured to generate the TBO graph according to the feature extraction result.

The text recognition module 303 may input the text-line image to a pre-trained lightweight text sequence recognition model, and obtain an output recognition result; wherein a feature extraction convolutional network structure in the lightweight text sequence recognition model is determined by automatic machine learning model search.

The specific workflow of the apparatus embodiment shown in FIG. 3 can be obtained with reference to the related description in the above method embodiment and is not repeated.

In conclusion, by use of the solution in the apparatus embodiment of the present application, optical character recognition may be performed with a lightweight universal optical character recognition method consisting of a lightweight text scale prediction model, a lightweight text detection model, and a lightweight text sequence recognition model, which, on the premise of ensuring high recognition accuracy, has characteristics of simple logic and a small amount of calculation, thereby improving a recognition speed, can be run in various computing environments such as a GPU and a CPU, and has wide applicability. In addition, a text area in a to-be-recognized image can be rapidly and accurately determined based on a text mask graph and a text scale graph output by a lightweight text scale prediction model, and a dimension of a text area image can be directly adjusted to an appropriate dimension, so as to facilitate subsequent processing, which improves the accuracy of subsequent processing results and avoids problems such as low efficiency and precision loss caused by scaling of an image to a plurality of different dimensions tin the traditional method. Moreover, text lines in a text area image can be rapidly and accurately determined based on a TCL response graph and a TBO graph output by a lightweight text detection model. Furthermore, text area images acquired may be processed in parallel, thereby further improving the processing speed. Besides, a feature extraction convolutional network structure in the lightweight text sequence recognition model can be determined by automatic machine learning model search, which abandons the traditional method of manually designing the network structure, thereby greatly reducing the labor cost, and has higher precision.

According to embodiments of the present application, the present application further provides an electronic device and a readable storage medium.

Figure 4:
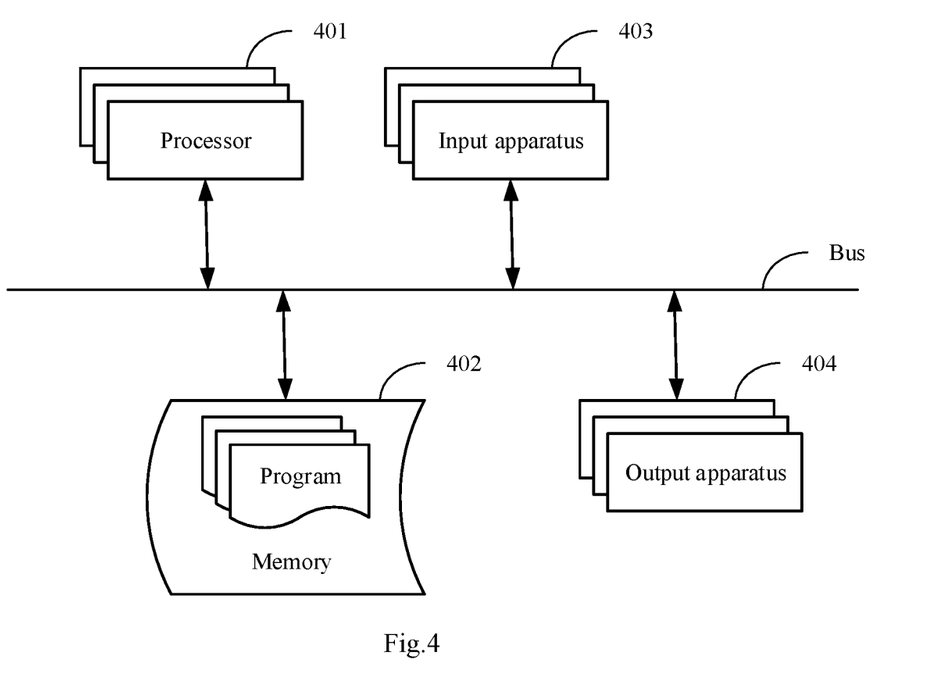
FIG. 4 is a block diagram of an electronic device for a method according to an embodiment of the present application.

As shown in FIG. 4, it is a block diagram of an electronic device for a method according to an embodiment of the present application. The electronic device is intended to represent various forms of digital computers, such as laptops, desktops, workbenches, personal digital assistants, servers, blade servers, mainframe computers and other suitable computers. The electronic device may further represent various forms of mobile devices, such as personal digital assistant, cellular phones, smart phones, wearable devices and other similar computing devices. The components, their connections and relationships, and their functions shown herein are examples only, and are not intended to limit the implementation of the present application as described and/or required herein.

As shown in FIG. 4, the electronic device includes: one or more processors 401, a memory 402, and interfaces for connecting various components, including high-speed interfaces and low-speed interfaces. The components are connected to each other by using different buses and may be installed on a common motherboard or otherwise as required. The processor may process instructions executed in the electronic device, including instructions stored in the memory or on the memory to display graphical information of a graphical user interface on an external input/output apparatus (such as a display device coupled to the interfaces). In other implementations, a plurality of processors and/or buses may be used together with a plurality of memories if necessary. Similarly, a plurality of electronic devices may be connected, each of which provides some necessary operations (for example, as a server array, a set of blade servers, or a multiprocessor system). One processor 401 is taken as an example is FIG. 4.

The memory 402 is the non-instantaneous computer-readable storage medium according to the present application. The memory stores instructions executable by at least one processor to make the at least one processor perform the method according to the present application. The non-instantaneous computer-readable storage medium according to the present application stores computer instructions. The computer instructions are used to make a computer perform the method according to the present application.

The memory 402, as a non-instantaneous computer-readable storage medium, may be configured to store non-instantaneous software programs, non-instantaneous computer executable programs and modules, for example, program instructions/modules corresponding to the method in the embodiment of the present application. The processor 401 runs the non-instantaneous software programs, instructions and modules stored in the memory 402 to execute various functional applications and data processing of a server, that is, to implement the method in the above method embodiment.

The memory 402 may include a program storage area and a data storage area. The program storage area may store an operating system and an application required by at least one function; and the data storage area may store data created according to use of the electronic device. In addition, the memory 402 may include a high-speed random access memory, and may further include a non-instantaneous memory, for example, at least one disk storage device, a flash memory device, or other non-instantaneous solid-state storage devices. In some embodiments, the memory 402 optionally includes memories remotely disposed relative to the processor 401. The remote memories may be connected to the electronic device over a network. Examples of the network include, but are not limited to, the Internet, intranets, blockchain networks, local area networks, mobile communication networks and combinations thereof.

The electronic device may further include: an input apparatus 403 and an output apparatus 404. The processor 401, the memory 402, the input apparatus 403 and the output apparatus 404 may be connected through a bus or in other manners. In FIG. 4, the connection through a bus is taken as an example.

The input apparatus 403 may receive input numerical information or character information, and generate key signal input related to user setting and function control of the electronic device, for example, input apparatuses such as a touch screen, a keypad, a mouse, a track pad, a touch pad, a pointer, one or more mouse buttons, a trackball, and a joystick. The output apparatus 404 may include a display device, an auxiliary lighting apparatus and a tactile feedback apparatus (e.g., a vibration motor). The display device may include, but is not limited to, a liquid crystal display, a light-emitting diode display, and a plasma display. In some implementations, the display device may be a touch screen.

Various implementations of the systems and technologies described herein may be implemented in a digital electronic circuit system, an integrated circuit system, an application-specific integrated circuit, computer hardware, firmware, software, and/or combinations thereof. The various implementations may include: being implemented in one or more computer programs. The one or more computer programs may be executed and/or interpreted on a programmable system including at least one programmable processor. The programmable processor may be a special-purpose or general-purpose programmable processor, receive data and instructions from a storage system, at least one input apparatus and at least one output apparatus, and transmit the data and the instructions to the storage system, the at least one input apparatus and the at least one output apparatus.

The computing programs (also referred to as programs, software, software applications, or code) include machine instructions for programmable processors, and may be implemented by using high-level procedural and/or object-oriented programming languages, and/or assembly/machine languages. As used herein, the terms "machine-readable medium" and "computer-readable medium" refer to any computer program product, device, and/or apparatus (e.g., a magnetic disk, an optical disc, a memory, and a programmable logic device) configured to provide machine instructions and/or data to a programmable processor, including a machine-readable medium that receives machine instructions serving as machine-readable signals. The term "machine-readable signal" refers to any signal for providing the machine instructions and/or data to the programmable processor.

To provide interaction with a user, the systems and technologies described here can be implemented on a computer. The computer has: a display apparatus (e.g., a cathode-ray tube or a liquid crystal display monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, voice input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network, a wide area network, a block chain network and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, also known as a cloud computing server or cloud host, which is a host product in the cloud computing service system to solve the problems of difficult management and weak business scalability in the traditional physical host and VPS services.

It shall be understood that the steps can be reordered, added, or deleted using the various forms of processes shown above. For example, the steps described in the present application may be executed in parallel or sequentially or in different sequences, provided that desired results of the technical solutions disclosed in the present application are achieved, which is not limited herein.

The above specific implementations do not limit the extent of protection of the present application. Those skilled in the art should understand that various modifications, combinations, sub-combinations, and replacements can be made according to design requirements and other factors. Any modifications, equivalent substitutions and improvements made within the spirit and principle of the present application all should be included in the extent of protection of the present application.

What is claimed is:

1. A method for optical character recognition, comprising:
   determining, for a to-be-recognized image, a text bounding box surrounding a text area in the to-be-recognized image, extracting a text area image from the to-be-recognized image according to the text bounding box, determining an adjustment mode of the text area image, and adjusting a dimension of the text area image according to the determined adjustment mode;
   determining a bounding box -surrounding text lines in the text area image, and extracting a text-line image from the text area image according to the bounding box; and
   performing text sequence recognition on the text-line image, and obtaining a recognition result,
   wherein the method further comprises:
   inputting the to-be-recognized image to a pre-trained text scale prediction model, and obtaining a text mask graph with a single channel and a text scale graph;
   wherein values of pixels in the text mask graph respectively represent probabilities of the corresponding pixels belonging to a text area, and values of pixels in the text scale graph respectively represent ratios of dimensions of the shortest edges of text lines to which the corresponding pixels belong to a preset dimension;
   wherein the determining a text bounding box surrounding a text area in the to-be-recognized image comprises: determining the text bounding box surrounding the text area in the to-be-recognized image according to the text mask graph; and
   determining, for any text area image, values of pixels of the text area image in the text scale graph respectively, the pixels of the text area image having the same value in the text scale graph, p1 wherein the adjustment mode of the text area image comprises: under a precondition of retaining an aspect ratio of the text area image, adjusting width and height dimensions of the text area image to make the dimensions of the shortest edges of the text lines after adjustment equal to the preset dimension.

2. The method according to claim 1, wherein the determining the text bounding box surrounding a text area in the to-be-recognized image according to the text mask graph comprises:
   determining text connected components in the text mask graph through connected component analysis; and
   determining, for any text connected component, a minimum rectangle comprising the text connected component in the to-be-recognized image respectively as a text bounding box corresponding to the text connected component.

3. The method according to claim 1, wherein
   the lightweight text scale prediction model comprises: a first feature extraction module, a first prediction module and a second prediction module; wherein the first feature extraction module is configured to perform feature extraction on an input image, the first prediction module is configured to generate the text mask graph according to a feature extraction result, and the second prediction module is configured to generate the text scale graph according to the feature extraction result.

4. The method according to claim 1, wherein the method further comprises: inputting the text area image to a pre-trained lightweight text detection model, and obtain a text center line response graph with a single channel and a text border offset graph with four channels;

wherein values of pixels in the text center line response graph respectively represent probabilities of the corresponding pixels belonging to a text-line center line area, and values of pixels in the text border offset graph respectively represent horizontal and vertical distances of the corresponding pixels from upper borders of text lines to which they belong and from lower borders of the text lines to which they belong; and the determining a bounding box of text lines in the text area image comprises: determining the bounding box of the text lines in the text area image according to the text center line response graph and the text border offset graph.

5. The method according to claim 4, wherein the determining the bounding box of the text lines in the text area image according to the text center line response graph and the text border offset graph comprises:

determining center lines of the text lines by performing connected component analysis on the text center line response graph; and determining, for any center line, a bounding box of the text line corresponding to the center line according to values of pixels of the center line in the text border offset graph respectively, and making the bounding box correspond to the text area image.

6. The method according to claim 4, wherein the lightweight text detection model comprises: a second feature extraction module, a third prediction module and a fourth prediction module; wherein the second feature extraction module is configured to perform feature extraction on an input image, the third prediction module is configured to generate the text center line response graph according to a feature extraction result, and the fourth prediction module is configured to generate the text border offset graph according to the feature extraction result.

7. The method according to claim 1, wherein the performing text sequence recognition on the text-line image, and obtaining a recognition result comprises: inputting the text-line image to a pre-trained lightweight text sequence recognition model, and obtaining an output recognition result; wherein a feature extraction convolutional network structure in the lightweight text sequence recognition model is determined by automatic machine learning model search.

8. An electronic device, comprising:

at least one processor; and a memory communicatively connected with the at least one processor;

wherein the memory stores instructions executable by the at least one processor, and the instructions are executed by the at least one processor to enable the at least one processor to perform a method for optical character recognition, wherein the method comprises:

determining, for a to-be-recognized image, a text bounding box of surrounding a text area in the to-be-recognized image, and extracting a text area image from the to-be-recognized image according to the text bounding box, determining an adjustment mode of the text area image, and adjusting a dimension of the text area image according to the determined adjustment mode;

determining a bounding box surrounding text lines in the text area image, and extracting a text-line image from the text area image according to the bounding box; and performing text sequence recognition on the text-line image, and obtaining a recognition result, the method further comprises:

inputting the to-be-recognized image to a pre-trained text scale prediction model, and obtaining a text mask graph with a single channel and a text scale graph;

wherein values of pixels in the text mask graph respectively represent probabilities of the corresponding pixels belonging to a text area, and values of pixels in the text scale graph respectively represent ratios of dimensions of the shortest edges of text lines to which the corresponding pixels belong to a preset dimension;

wherein the determining a text bounding box surrounding a text area in the to-be-recognized image comprises: determining the text bounding box surrounding the text area in the to-be-recognized image according to the text mask graph; and determining, for any text area image, values of pixels of the text area image in the text scale graph respectively, the pixels of the text area image having the same value in the text scale graph, wherein the adjustment mode of the text area image comprises: under a precondition of retaining an aspect ratio of the text area image, adjusting width and height dimensions of the text area image to make the dimensions of the shortest edges of the text lines after adjustment equal to the preset dimension.

9. The electronic device according to claim 8, wherein the determining the text bounding box of surrounding a text area in the to-be-recognized image according to the text mask graph comprises:

determining text connected components in the text mask graph through connected component analysis; and determining, for any text connected component, a minimum rectangle comprising the text connected component in the to-be-recognized image respectively as a text bounding box corresponding to the text connected component.

10. The electronic device according to claim 8, wherein the lightweight text scale prediction model comprises: a first feature extraction module, a first prediction module and a second prediction module; wherein the first feature extraction module is configured to perform feature extraction on an input image, the first prediction module is configured to generate the text mask graph according to a feature extraction result, and the second prediction module is configured to generate the text scale graph according to the feature extraction result.

11. The electronic device according to claim 8, wherein the method further comprises: inputting the text area image to a pre-trained lightweight text detection model, and obtain text center line response graph with a single channel and a text border offset graph with four channels;

wherein values of pixels in the text center line response graph respectively represent probabilities of the corresponding pixels belonging to a text-line center line area, and values of pixels in the text border offset graph respectively represent horizontal and vertical distances of the corresponding pixels from upper borders of text lines to which they belong and from lower borders of the text lines to which they belong; and the determining a bounding box of text lines in the text area image comprises: determining the bounding box of the text lines in the text area image according to the text center line response graph and the text border offset graph.

12. The electronic device according to claim 11, wherein the determining the bounding box of the text lines in the text area image according to the text center line response graph and the text border offset graph comprises:

determining center lines of the text lines by performing connected component analysis on the text center line response graph; and determining, for any center line, a bounding box of the text line corresponding to the center line according to values of pixels of the center line in the text border offset graph respectively, and making the bounding box correspond to the text area image.

13. The electronic device according to claim 11, wherein the lightweight text detection model comprises: a second feature extraction module, a third prediction module and a fourth prediction module; wherein the second feature extraction module is configured to perform feature extraction on an input image, the third prediction module is configured to generate the text center line response graph according to a feature extraction result, and the fourth prediction module is configured to generate the text border offset graph according to the feature extraction result.

14. A non-transitory computer readable storage medium with computer instructions stored thereon, wherein the computer instructions are used for causing a computer to perform a method for optical character recognition, wherein the method comprises:

determining, for a to-be-recognized image, a text bounding box surrounding a text area in the to-be-recognized image, and extracting a text area image from the to-be-recognized image according to the text bounding box, determining an adjustment mode of the text area image, and adjusting a dimension of the text area image according to the determined adjustment mode;

determining a bounding box surrounding text lines in the text area image, and extracting a text-line image from the text area image according to the bounding box; and performing text sequence recognition on the text-line image, and obtaining a recognition result, the method further comprises:

inputting the to-be-recognized image to a pre-trained text scale prediction model, and obtaining a text mask graph with a single channel and a text scale graph;

inputting the to-be-recognized image to a pre-trained text scale prediction model, and obtaining a text mask graph with a single channel and a text scale graph;

wherein values of pixels in the text mask graph respectively represent probabilities of the corresponding pixels belonging to a text area, and values of pixels in the text scale graph respectively represent ratios of dimensions of the shortest edges of text lines to which the corresponding pixels belong to a preset dimension;

wherein the determining a text bounding box surrounding a text area in the to-be-recognized image comprises: determining the text bounding box surrounding the text area in the to-be-recognized image according to the text mask graph; and determining, for any text area image, values of pixels of the text area image in the text scale graph respectively, the pixels of the text area image having the same value in the text scale graph, wherein the adjustment mode of the text area image comprises: under a precondition of retaining an aspect ratio of the text area image, adjusting width and height dimensions of the text area image to make the dimensions of the shortest edges of the text lines after adjustment equal to the preset dimension.

\* \* \* \* \*

UNITED STATES PATENT AND TRADEMARK OFFICE
CERTIFICATE OF CORRECTION

| | |
|---|---|
| PATENT NO. | : 11,694,461 B2 |
| APPLICATION NO. | : 17/199072 |
| DATED | : July 4, 2023 |
| INVENTOR(S) | : Mengyi En et al. |

It is certified that error appears in the above-identified patent and that said Letters Patent is hereby corrected as shown below:

On the Title Page

Item (30), please include --Foreign Application Priority Data, Jun. 16, 2020, (CN) 2020105506941--

Signed and Sealed this
Twelfth Day of September, 2023

Katherine Kelly Vidal
*Director of the United States Patent and Trademark Office*